United States Patent
Wright et al.

(10) Patent No.: US 12,026,020 B2
(45) Date of Patent: Jul. 2, 2024

(54) DUST MITIGATION

(71) Applicant: Nokia Technologies Oy, Espoo (FI)

(72) Inventors: Christopher Wright, London (GB); Harry Cronin, Cambridge (GB); Phil Catton, Cambridge (GB); William Schnabel, Surrey (GB)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/724,040

(22) Filed: Apr. 19, 2022

(65) Prior Publication Data
US 2022/0342454 A1 Oct. 27, 2022

(30) Foreign Application Priority Data

Apr. 21, 2021 (EP) ..................... 21169555

(51) Int. Cl.
*G06F 1/16* (2006.01)
*B06B 1/06* (2006.01)

(52) U.S. Cl.
CPC .............. *G06F 1/1681* (2013.01); *B06B 1/06* (2013.01); *G06F 1/1616* (2013.01); *G06F 1/1652* (2013.01)

(58) Field of Classification Search
None
See application file for complete search history.

(56) References Cited

U.S. PATENT DOCUMENTS

| 8,707,516 | B2 | 4/2014 | Koyama et al. |
| 11,054,869 | B2* | 7/2021 | Moon .................. G06F 1/1656 |
| 2006/0234786 | A1 | 10/2006 | Taniguchi et al. |
| 2009/0178240 | A1 | 7/2009 | Koyama et al. |

(Continued)

FOREIGN PATENT DOCUMENTS

| CN | 1759590 A | 4/2006 |
| CN | 201223104 Y | 4/2009 |

(Continued)

OTHER PUBLICATIONS

"Cilllia", Tangible Media Group, Retrieved on Apr. 5, 2022, Webpage available at : https://tangible.media.mit.edu/project/cilllia/.

(Continued)

*Primary Examiner* — Anthony Q Edwards
*Assistant Examiner* — Rashen E Morrison
(74) *Attorney, Agent, or Firm* — ALSTON & BIRD LLP

(57) ABSTRACT

Dust mitigation techniques are disclosed. An example apparatus includes a first component coupled in a movable relationship with a second component. The first component or the second component includes a recess accessible through an aperture. The apparatus also includes a brush disposed at the aperture and comprising fibers configured to prevent intrusion of dust into the recess. The apparatus also includes a vibration device configured to deliver a vibrational stimulus to the brush, wherein the vibration device activates a dust collection mode in response to a first movement of the first component relative to the second component and activates a dust shedding mode in response to a second movement of the first component relative to the second component.

20 Claims, 6 Drawing Sheets

(56) References Cited

U.S. PATENT DOCUMENTS

2010/0182738 A1    7/2010    Visser et al.
2017/0060183 A1    3/2017    Zhang et al.

FOREIGN PATENT DOCUMENTS

| CN | 202539144 U | 11/2012 |
| CN | 108237094 A | 7/2018 |
| CN | 207995146 U | 10/2018 |
| CN | 209376090 U | 9/2019 |
| EP | 0716359 A1 | 6/1996 |
| JP | 2009-071747 A | 4/2009 |
| WO | 2008/140308 A1 | 11/2008 |

OTHER PUBLICATIONS

Kim et al., "On the Forward and Backward Motion of Milli-Bristle-Bots", arXiv, Feb. 24, 2020, pp. 1-11.

"Tiny Vibration-Powered Robots Are the Size of the World's Smallest Ant", RH Gatech, Retrieved on Apr. 5, 2022, Webpage available at : https://rh.gatech.edu/news/623453/tiny-vibration-powered-robots-are-size-worlds-smallest-ant.

Kim et al., "Experimental and Modeling Studies of the Stream-Wise Filter Vibration Effect on the Filtration Efficiency", Aerosol Science and Technology, vol. 40, No. 6, Nov. 22, 2006, pp. 389-395.

"Samsung Galaxy Z Flip teardown reveals hinge can't brush off all types of dust", Mobilescout, Retrieved on Apr. 5, 2022, Webpage available at : https://www.mobilescout.com/smartphone/news/n115180/galaxy-z-flip dust-test-teardown-reveals-hinge/.

Abubakar et al., "Environmental dust repelling from hydrophilic/hydrophobic surfaces under sonic excitations", Scientifc Reports, vol. 10, Nov. 9, 2020, 22 pages.

Extended European Search Report received for corresponding European Patent Application No. 21169555.6, dated Oct. 27, 2021, 6 pages.

Office Action for Chinese Application No. 202210418581.5 dated Dec. 26, 2023, 21 pages.

\* cited by examiner

DUST MITIGATION

RELATED APPLICATION

This application claims priority to the European patent application number 21169555.6, filed on Apr. 21, 2021, the content of which is incorporated herein by reference in its entirety.

TECHNOLOGICAL FIELD

Example embodiments relate to techniques for excluding dust from recesses of an electronic device.

BACKGROUND

Various types of electronic devices have openings that can allow ingress of dust particles into recesses. For example, smart phones with a clamshell form factor will generally include a hinge. Depending on the hinge design, the opening and closing of the hinge may cause a surface of the hinge to ingress into an internal recess, potentially drawing dust into the internal recess. Some smart phones such as scrolling phones may have extendable or retractable surfaces that can cause dust to be drawn into internal recesses. The intrusion of dust into internal recesses of the device can cause various problems that reduce the performance and lifetime of the device.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various embodiments there is provided an apparatus that includes a first component coupled in a movable relationship with a second component, wherein the first component or the second component includes a recess accessible through an aperture. The apparatus also includes a brush disposed at the aperture and having fibers configured to prevent intrusion of dust into the recess. The apparatus also includes a vibration device configured to deliver a vibrational stimulus to the brush. The vibration device activates a dust collection mode in response to a first movement of the first component relative to the second component and activates a dust shedding mode in response to a second movement of the first component relative to the second component.

The brush may include a first set of fibers that exhibit a first resonant response to the vibrational stimulus and a second set of fibers that exhibit a second resonant response to the vibrational stimulus. Additionally, the vibrational stimulus may include a first vibration mode to activate the dust collection mode and a second vibration mode to activate the dust shedding mode. For example, the brush may include a set of fibers that exhibit a first resonant response to the first vibration mode and a second resonant response to the second vibration mode. In some embodiments, the first vibration mode may be a first frequency and the second vibration mode may be a second frequency different from the first frequency.

During the dust collection mode, the fibers may move laterally across the aperture to increase collection of dust. During the dust shedding mode, the fibers may exert a net force that moves dust in a direction away from the recess.

The apparatus may be a computing device with a clamshell form factor wherein the first component and the second component are coupled by a hinge. The dust collection mode may be activated when an angle of the hinge increases and the dust shedding mode may be activated when an angle of the hinge decreases.

In some embodiments, the second component is retractable within the first component. The dust collection mode may be activated when the second component is retracted into the first component, and the dust shedding mode may be activated when the second component is extended from the first component.

In some embodiments, the vibration device is an acoustic speaker.

According to various embodiments, there is provide device that includes means for detecting a type of user manipulation of an electronic device that includes a first component coupled in a movable relationship with a second component. The first component or the second component includes a recess accessible through an aperture. The device also includes means for activating a selected vibration mode of a brush disposed at the aperture. The selected vibration mode is selected from among a dust shedding mode and a dust collection mode based on the type of user manipulation.

The brush may include a first set of fibers and a second set of fibers, wherein the selected vibration mode generates a first response in the first set of fibers and a second response in the second set of fibers, wherein the first response is different from the second response.

The dust shedding mode may be activated by a first frequency of the vibration device and the dust collection mode may be activated by a second frequency of the vibration device, wherein the first frequency is different from the second frequency. Detecting a type of user manipulation may include detecting a change in a hinge angle or detecting a translational movement of the second component relative to the first component.

In some embodiments, the means for detecting and the means for activating include at least one processor and at least one memory including computer program code. The at least one memory and computer program code are configured, with the at least one processor, to cause the performance of the device. Additionally, the means for detecting the type of user manipulation can include one or more sensors for detecting the change in the hinge angle or the translational movement of the second component relative to the first component. The means for activating the selected vibration mode can include one or more vibration devices such as mechanical vibrators or acoustic speakers.

BRIEF DESCRIPTION OF THE DRAWINGS

Example embodiments will now be described, by way of non-limiting example, with reference to the accompanying drawings, in which.

DETAILED DESCRIPTION

The present disclosure describes techniques for preventing or reducing the ingress of dust into the internal recesses of an apparatus, including electronic devices such as smart phones, laptop computers, and the like. Electronic devices with components such as hinges or sliding components may be susceptible to collecting dust when activated. The present disclosure describes techniques to exclude dust from internal compartments or recesses by creating vibration modes at the location of an inlet that activates the fibers of a brush. An apparatus in accordance with embodiments can use different vibration modes to activate different mechanical movements of the brush fibers located at the inlet to either collect or shed dust. The mechanical movements of the brush fibers can be controlled based on the mechanical response properties of the brush fibers to different vibrational stimulus. The arrangement of the brush fibers relative to one another and their mechanical response properties determine whether dust will be collected or shed for a given stimulus. The vibration modes can include a shedding mode and a collecting mode. In some embodiments, specific vibration modes may be activated depending on the how the user is manipulating the device, such when the user is opening or closing a hinge or sliding a screen in or out.

Figure 1A:
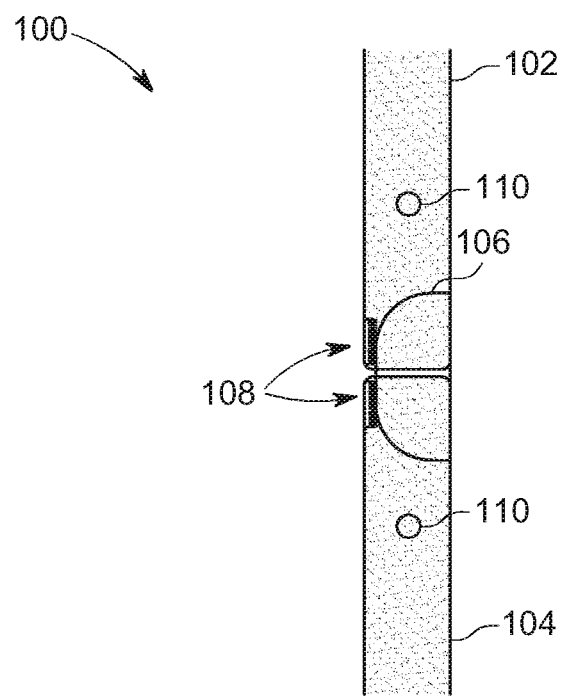
FIGS. 1A and 1B show an example electronic device with dust mitigation in accordance with embodiments.
Figure 1B:
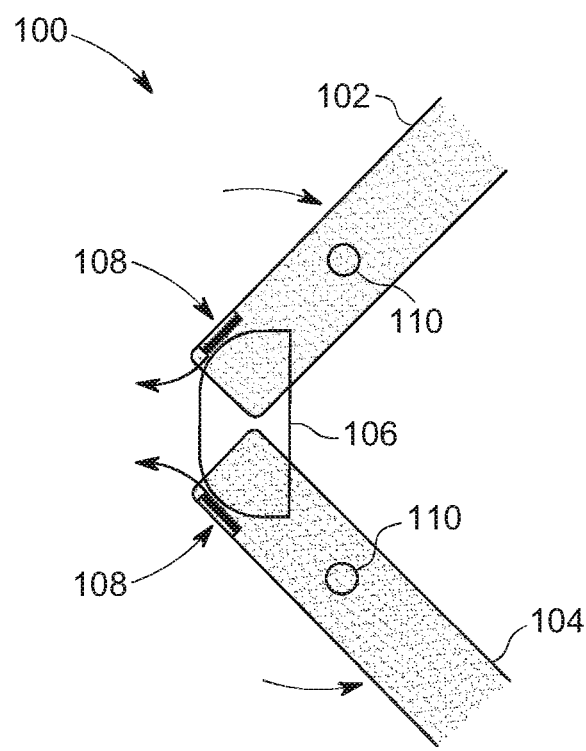

FIGS. 1A and 1B show an example electronic device with dust mitigation in accordance with embodiments. The device 100 may be any suitable electronic device, such as smartphone, laptop computer, tablet and others. For example, the device 100 may be a smart phone with a clamshell form factor. The device 100 has a first component 102 and a second component 104 coupled together by a hinge mechanism 106 that fits into hinge receptacles disposed on each component. In some embodiments, the first component 102 may be part of the device 100 that houses a display screen and the second component 104 may be a part of the device 100 that houses a keyboard. In some embodiments, the first and second components may both have displays or portions of a single flexible display. Various other arrangements are also possible.

FIG. 1A shows the device in a fully opened position, and FIG. 1B shows the device moving to a closed positon. The hinge mechanism 106 is configured to slide into hinge receptacles when the user opens the device as shown in FIG. 1A. An inlet or aperture between the outer surface of the hinge and the internal surface of the hinge receptacle provides access to internal recesses that may be susceptible to collecting dust. To prevent the intrusion of dust, one or more brushes 108 are coupled to the internal surfaces of hinge receptacles and disposed in the gap such that they contact the hinge.

Each component of the device 100 can also include a vibration device 110 configured to deliver a vibrational stimulus to the brushes 108 to activate a vibration mode in the fibers of the respective brushes 108. The vibration device 110 may be any type of device capable of creating mechanical vibrations, such as an acoustic speaker, or an electric motor, for example. The mechanical vibrations may include lamb waves, Rayleigh waves, surface acoustic waves, or a combination thereof. The vibration device 110 may also serve other functions. For example, in the case of a smart phone, the vibration device 110 may be one of the phones speakers, or the device used to generate the phones vibrating alert. Additionally, the vibration device 110 may also include dedicated hardware specifically included to deliver a vibrational stimulus to the brushes 108, including a piezoelectric device or a capacitive micromachined ultrasonic transducer (CMUT). The vibration device 110 may be disposed in close proximity the brushes 108, for example, underlying the brush structure.

The vibration device 110 may be configured to activate different vibration modes depending on the movement of the first component relative to the second component. The vibration modes can include a dust shedding mode and a dust collection mode. The shedding mode causes dust to be expelled from the brush 108 and may be activated when the movement of the hinge is such that the released dust will fall out of the device 100 rather than collect inside the internal recesses. The collection mode causes dust to be gathered into the brush 108 and may be activated any time that the movement of the hinge is such that the dust would otherwise tend to penetrate into internal recesses. Whether dust will have a tendency to enter the recess or be expelled from the recess depends on the design of the device and whether air or another surface is moving into the internal recess.

The angle of the hinge may be detected by a sensor to determine whether the hinge angle is decreasing, indicating that the device is being closed, or whether the hinge angle is increasing, indicating the device is being opened. Different vibration modes may be activated depending on the change in hinge angle. For example, FIG. 1B shows the device 100 being closed, which cases the surface of the hinge 106 to be pulled out of the hinge receptacle. In this situation, the released dust will not be pulled into the recess by the hinge 106, so activating the shedding mode during closing of the device 100 will cause the dust to fall away without entering the recess. By contrast, if the device 100 is opened, the surface of the hinge 106 slides into the hinge receptacle. Activating the collection mode when opening the device 100 can cause dust particles to be collected by the brush, thereby preventing dust from being pulled into the recess by the hinge 106. Any dust collected by the brush 108 can be shed the next time that the device 100 is closed and the shedding mode is activated.

Figure 2A:
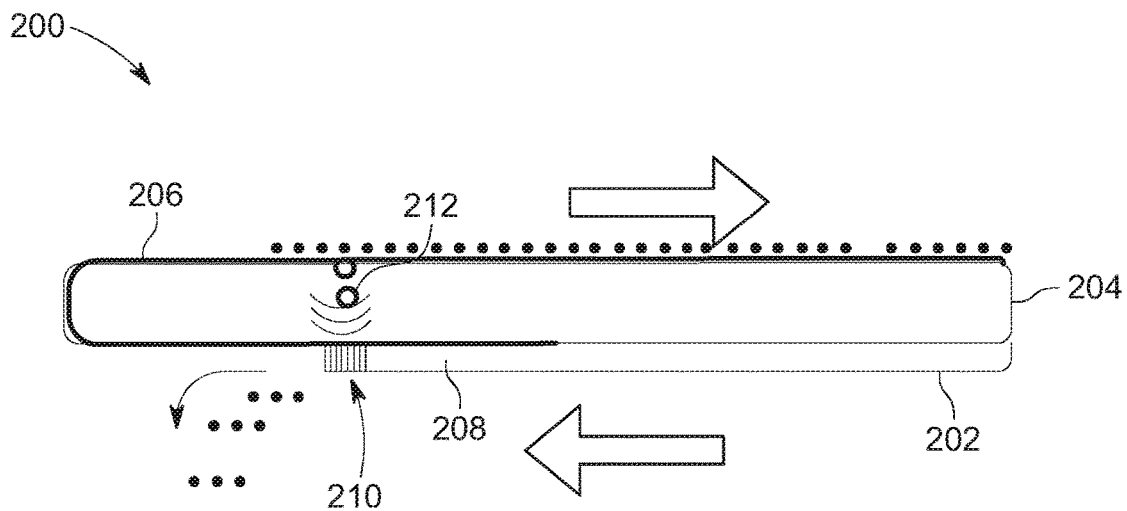
FIGS. 2A and 2B show another example electronic device with dust mitigation in accordance with embodiments.
Figure 2B:
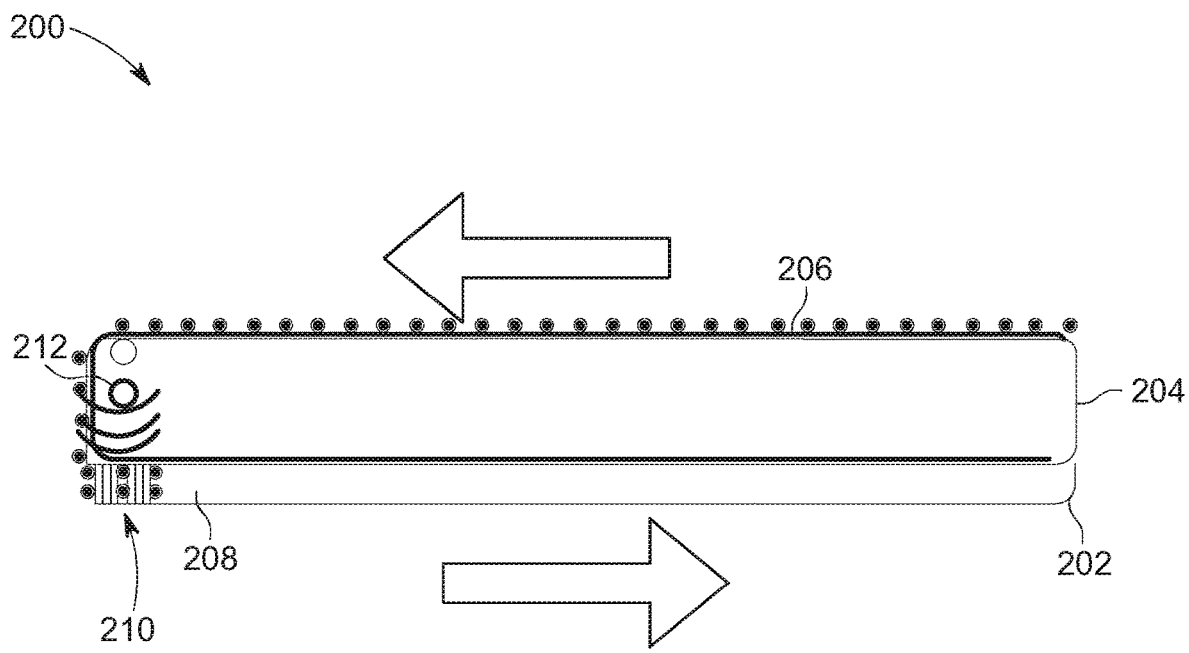

FIGS. 2A and 2B show another example electronic device with dust mitigation in accordance with embodiments. The electronic device 200 includes a first component 202 that includes a recess configured to hold a second component 204 that can slide into or out of the recess. In this example, the second component 204 includes a scrollable display screen 206. To expand the screen, the user extends the second component 204, which causes the screen 206 to move out of the recess, creating a larger screen surface for the user. Sliding the second component 204 back into the recess causes the screen 206 to retract back into the recess, resulting in a more compact device configuration. Other embodiments of electronic devices with sliding surfaces can include electronic devices with retractable keyboards, for example.

Between the first component 202 and the second component 204 is a gap 208 that allows the screen 206 to enter the internal recess freely, but also provides an aperture for the possible ingress of dust into the recess. When the screen 206 enters the recess, any dust that may have collected on the screen 206 will be pulled toward the gap 208. To prevent dust particles from the entering the recess when the screen 206 is retracted, a brush 210 is coupled to the first component 202 and disposed in the gap 208 such that it contacts the screen 206.

Additionally, the device 200 also includes a vibration device 212, which may be included in the first component 202 or the second component 204. The vibration device 212 is configured to deliver a vibration that stimulates the brush fibers to generate a selected vibration mode. The vibration mode selected will depend on the motion of the first component 202 relative to the second component 204. For example, a dust collecting mode may be activated by the vibration device 212 when the second component is being retracted into the first component, as shown in FIG. 2B. This helps to ensure that any dust on the screen will be collected by the brush fibers rather than entering the recess. A dust shedding mode may be activated by the vibration device 212 when the second component is extracted out of the first component, as shown in FIG. 2A. This helps to ensure that any dust previously collected by the brush fibers will be removed from the brush fibers and released outside of the internal recess.

Depending on the design of a particular electronic device, it may sometimes be the case that dust ingress and egress may be more affected by air rather than a moving surface. For example, when the second component 204 is slid into the first component 202, the volume of the internal recess may be reduced, causing air to be expelled. Conversely, when the second component 204 is extended out of the first component 202, the volume of the internal recess may increase, causing air to be drawn in. The intrusion of air into the recess may also cause dust in the air to be drawn into the recess. Accordingly, in some embodiments, the shedding mode may be activated when the second component is retracted and air is being expelled, and the collection mode may be activated when the second component is extracted and air is being drawn in. The determination of which mode to activate will depend on whether the intrusion of a component surface or intrusion of air is the dominant mode of dust intrusion, which will depend on the design of the particular electronic device.

The different vibration modes may be activated in various ways. In some embodiments, the vibration modes may be activated by generating a different vibration frequency. Different vibration frequencies may cause different movements of the brush fibers to either shed or collect dust. For example, the brush fibers may be actuated in a fashion that achieves a shared circular motion, which in turn creates a combined directional flow of debris or air across the coverage area of multiple fibers. The resonant response of the brush fibers will depend on the vibration frequency, amplitude, and direction as well as the properties of the brush fibers, such as length, stiffness, tilt angle, the degree of damping due to the interaction of the fiber tip with the opposing surface, the fiber material, and others. In some embodiments, the brush may include different types of brush fibers that each respond differently to the same vibration frequency.

Figure 3:
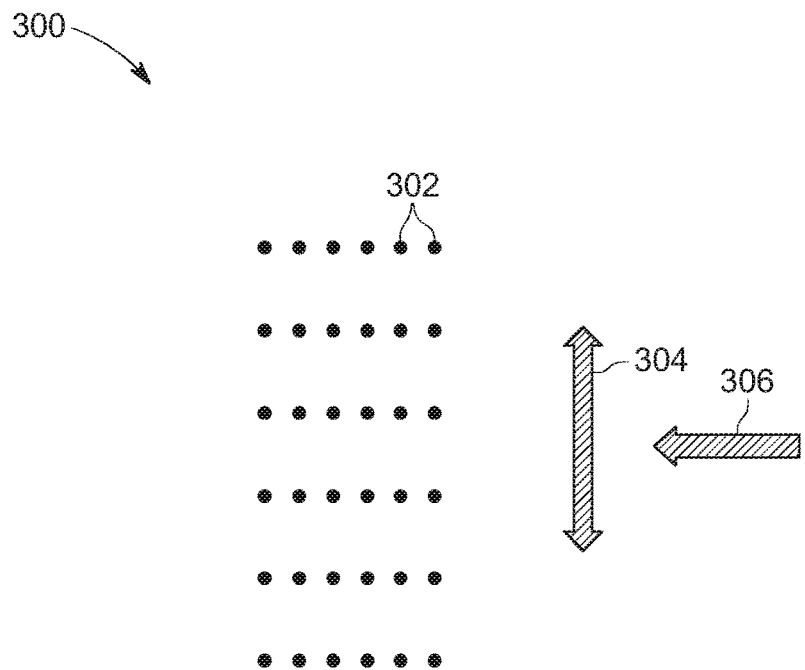
FIG. 3 is an example brush in accordance with embodiments.

FIG. 3 is an example brush in accordance with embodiments. In this example, the brush 300 includes a set of fibers 302 configured to have the same or nearly the same vibrational response characteristics. For the sake of clarity, a limited number of brush fibers are depicted, but it will be appreciated that the brush in accordance with embodiments can include several hundred or thousands of brush fibers.

The fibers 302 can be configured so that the vibration generates a desired response in the brush fibers to stimulate a net movement of dust in a desired direction based on how the tips of the fibers 302 interact with the opposing surface. For example, a circular procession of adjacent fiber tips with the same chirality can cause a net movement of dust in a desired direction. Additionally, the fiber tips may be angled in such a way that the fiber tips exert a greater net force on the opposing surface in a desired direction. For example, a net force may be generated when the friction between the fiber tip and the opposing surface is greater during forward movement of the fiber tip compared to the backward movement of the fiber tip.

The fibers 302 may be configured to exhibit a dust collection mode and a dust shedding mode. The collection mode may be activated by a first vibration stimulus when a surface or air is being drawn into an internal recess. In this example, the collection mode causes the tips of the fibers 302 to move back and forth laterally across the opposing surface as shown by arrow 304 to increase the collection of dust. The lateral motion may allow the fibers 302 to interact with a greater number of dust particles allowing the fibers 302 to collect more dust from the surface or the air being drawn into the recess.

The shedding mode may be activated by a second vibration stimulus when a surface or air is being drawn out of the internal recess. In this example, the shedding mode causes the tips of the fibers to exert a net force to the opposing surface in the direction away from the recess, as shown by arrow 306. The net outward force causes dust to be moved away from the recess and off the brush fibers to the external environment.

Figure 4:
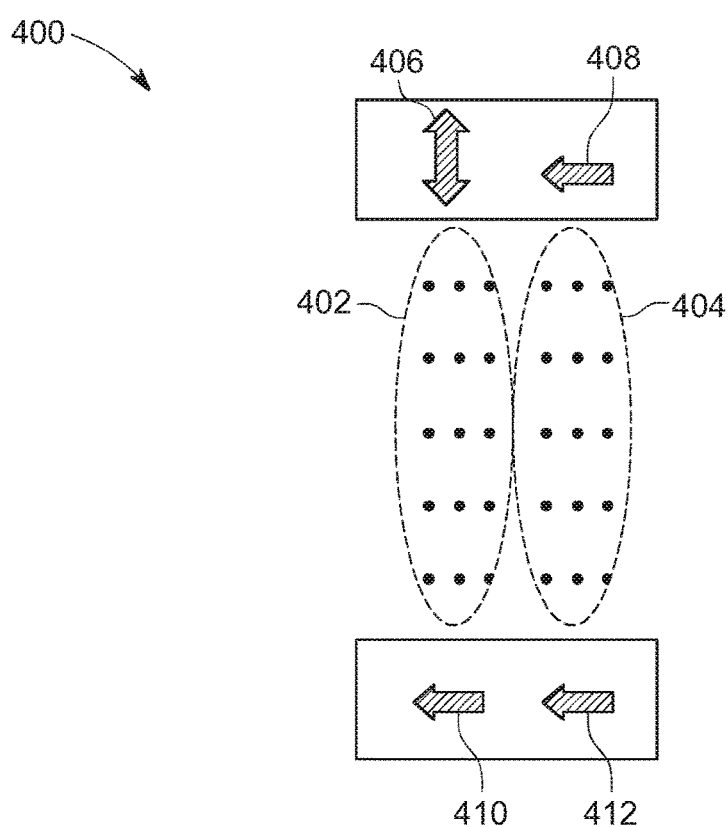
FIG. 4 is another example brush in accordance with embodiments.

FIG. 4 is an example brush in accordance with embodiments. In this example, the brush 400 includes two set of fibers 402 and 404, each set configured to have the different vibrational response characteristics. A first set of fibers 402 is disposed toward the gap and a second set of fibers 404 is disposed toward the internal recess. The two sets of fibers 402 404 may be configured to operate in a coordinated manner to implement either a dust collection mode or a dust shedding mode. The first set of fibers 402 and the second set of fibers 404 may have different physical characteristics that enable them to respond differently to the same vibrational stimulus.

The collection mode may be activated by a first vibration stimulus when a surface or air is being drawn into an internal recess. In this example, the collection mode causes the tips of the fibers in the first set of fibers 402 to move back and forth laterally across the opposing surface as shown by arrow 406, which enables the fibers to collect more dust from the surface or the air being drawn into the recess. During the collection mode, the tips of the fibers in the second set of fibers 404 exert a net force to the opposing surface in the direction away from the recess, as shown by arrow 408, so dust particles that get past the first set of fibers 402 are moved away from the recess and back toward the first set of fibers 402.

The shedding mode may be activated by a second vibration stimulus when a surface or air is being drawn out of the internal recess. In this example, the shedding mode causes the tips of the fibers in both sets of fibers 402 and 404 to exert a net force to the opposing surface in the direction away from the recess, as shown by arrows 410 and 412. As shown in FIG. 4, the first set of fibers 402 has switched from a lateral brush motion across the inlet to a motion that creates a net force in the direction exiting the recess, while the second set of fibers 404 continues to exert a net force to the opposing surface in the direction away from the recess. In some embodiments, the net force exerted by the second set of fibers 404 may increase during the shedding mode compared to the collection mode. The net outward force causes dust to be moved away from the recess and off the brush fibers to the external environment.

Figure 5:
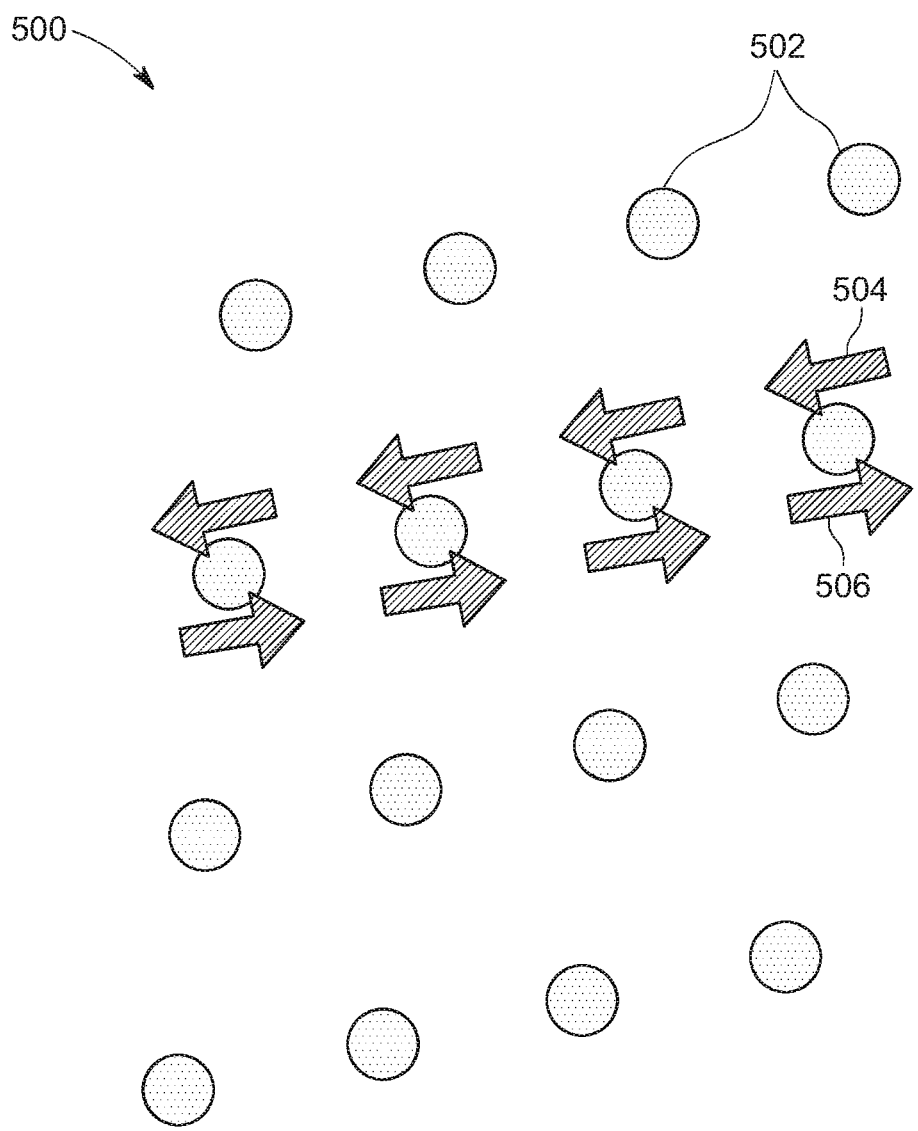
FIG. 5 is another example brush in accordance with embodiments.

FIG. 5 is another example brush in accordance with embodiments. In this example, the brush 500 includes brush fibers 502 configured to exhibit a circular movement in response to vibrational stimulus. The circular movement of the brush fibers can generate a forward movement of dust on the opposing surface as shown by the arrow 504, as well as a reverse movement of dust on the opposing surface as shown by the arrow 506. In some embodiments, the fibers may be arranged to reduce the area of the opposing surface that is exposed to the inwards movement of the fiber tips toward the internal recess. In this way, a net outward force may be generated to move dust away from the recess. For example, the brush fibers may be positioned with a stepped or staggered arrangement as shown in FIG. 5. In some embodiments, additional brush fibers may be disposed in relation to the fibers with circular motion to further inhibit the movement of dust toward the internal recess. The direction of rotation may be changed by changing the vibrational stimulus delivered to the fibers.

It will be appreciated that various other dust collection and shedding strategies may be implemented other than what is shown in FIGS. 3-5, depending on the physical characteristics of the fibers and the type of vibrational stimulus. Additionally, various combinations of different types of brush fibers may be combined in a single brush. For example, the brush 400 shown in FIG. 4 may have multiple alternating columns of the first set of fibers 402 and the second set of fibers 404. Additionally, a brush in accordance with embodiments may combine brush fibers from any of the embodiments shown in FIGS. 3-5. For example, an example brush could combine circular movement brush fibers from FIG. 5 with any of the other brush fibers shown in FIGS. 3 and 4.

In some embodiments, the brush fibers may be manufactured using a three-dimensional (3D) printing. The physical characteristics may be controlled to exhibit a desired vibration response based on the angle of the fibers, the stiffness of the fibers, and others. The vibrational stimulus used to achieve the different vibration modes may be controlled according to the frequency of the vibration, the amplitude of the vibration, the direction of the vibration, the distance of the vibration device from the fibers, and others. For example, switching from one vibration mode to another may involve changing the frequency of the vibration, the amplitude of the vibration, the direction of the vibration, etc. In some embodiments, the vibration stimulus for the collection mode may be implemented using one vibration device, and the vibration stimulus for the shedding mode may be implemented using a different vibration device.

The fibers may be made of any suitable material including a polymer such as PTFE, PET, nylon, various UV-curable acrylates, methacrylates, and others. The tilt angle of the fibers may be in a range between 0 to 30 degrees in any one axis, and the brush fiber diameter may vary between 10 to 500 microns. Brush fiber length may vary depending on the size of the aperture that is being protected and the degree of damping to be implemented to achieve a desired vibration response. Fibers may be in contact with the opposing surface, or not. In embodiments, the fiber length may be a range of between 100 microns and 10000 microns (10 mm).

The frequency of the vibration stimulus will depend on the resonant frequency (or a harmonic) of the brush fibers, which in turn depends on the physical characteristics of the fibers, such as length, stiffness, etc. The frequency of the vibration stimulus may be in a range from 0 to 100 kHz, depending on the properties of the fibers. In some embodiments, the frequency of the vibration may be less than 20 kHz.

Figure 6:
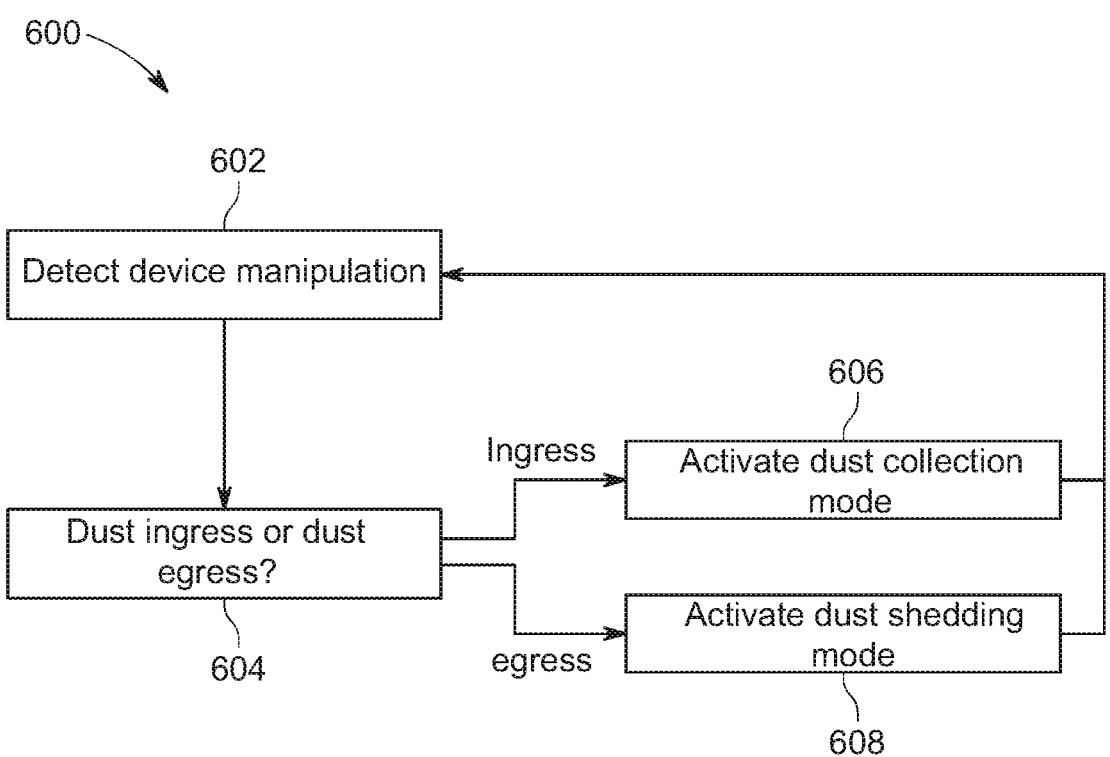
FIG. 6 is a process flow diagram showing a method of operating an electronic device to reduce ingress of dust into recesses of the device.

FIG. 6 is a process flow diagram showing a method of operating an electronic device to reduce ingress of dust into internal recesses of the device. The method may be performed by any suitable electronic device with components that are coupled in a movable relationship, for example, a hinged coupling or a slidable coupling. The electronic device may be a smartphone, laptop computer, and others. The method may be performed using hardware or a combination of hardware and software. It will be appreciated the processes shown in FIG. 6 may be performed in an order different from what is shown, and that the method 600 may also include fewer or additional processes depending on the design considerations of a particular embodiment. The method may begin at block 602.

At block 602, manipulation of the electronic device is detected. The manipulation indicates the user is manipulating the device in a way that could cause dust to enter an internal recess of the device. For example, the user may be adjusting the relative angle between a first component and a second component connected by hinge. Additionally, the user may be sliding one component relative to another component, such as to expand a scrollable screen or extend a retractable keyboard, for example. The manipulation may be detected by on-board sensors such as a hinge sensor, screen position sensor, keyboard position sensor, and the like.

At block 604, a determination is made regarding whether the manipulation of the device corresponds with a dust egress event or a dust ingress event. The dust egress event means that the manipulation of the device will tend to cause dust to move away from the internal recess. The dust ingress event means that the manipulation of the device will tend to cause dust to move toward the internal recess, for example, pulled into the recess by a dust carrying surface or inflowing air. Whether dust moves toward or away from the recess in response to a particular manipulation will be affected by the design features of a particular device. The determination may be preprogrammed into the device based on knowledge of which manipulations cause dust egress and which manipulations cause dust ingress. The type of user manipulation detected at block 604 determines the selection of a particular vibration mode. If the device manipulation corresponds with a dust ingress event, then the process advances to block 606. If the device manipulation corresponds with a dust egress event, then the process advances to block 608

At block 606, the dust collection mode is activated. The dust collection mode may be activated by activating a vibration device, such as an acoustic speaker or vibration alert mechanism, and enables the brush to collect more dust compared to a stationary brush. In some embodiments, the dust collection mode may be activated by causing the vibration device to operate at a particular frequency, amplitude, or directionality which is known to cause the brush to collect dust based on the known response of the brush fibers.

At block 608, the dust shedding mode is activated. The dust shedding mode may be activated by activating the vibration device in such a way that the brush tends to release dust, thereby cleaning the brush fibers. In some embodiments, the dust shedding mode may be activated by causing the vibration device to operate at a particular frequency, amplitude, or directionality which is known to cause the brush to shed dust based on the known response of the brush fibers. At least one of the frequency, amplitude, or directionality used to activate the shedding mode may be different compared to the collection mode. In some embodiments, the collection mode is activated by a first vibration device, and the dust shedding mode is activated by a second vibration device. In some embodiments, the same vibration device may be used for both modes.

Figure 7:
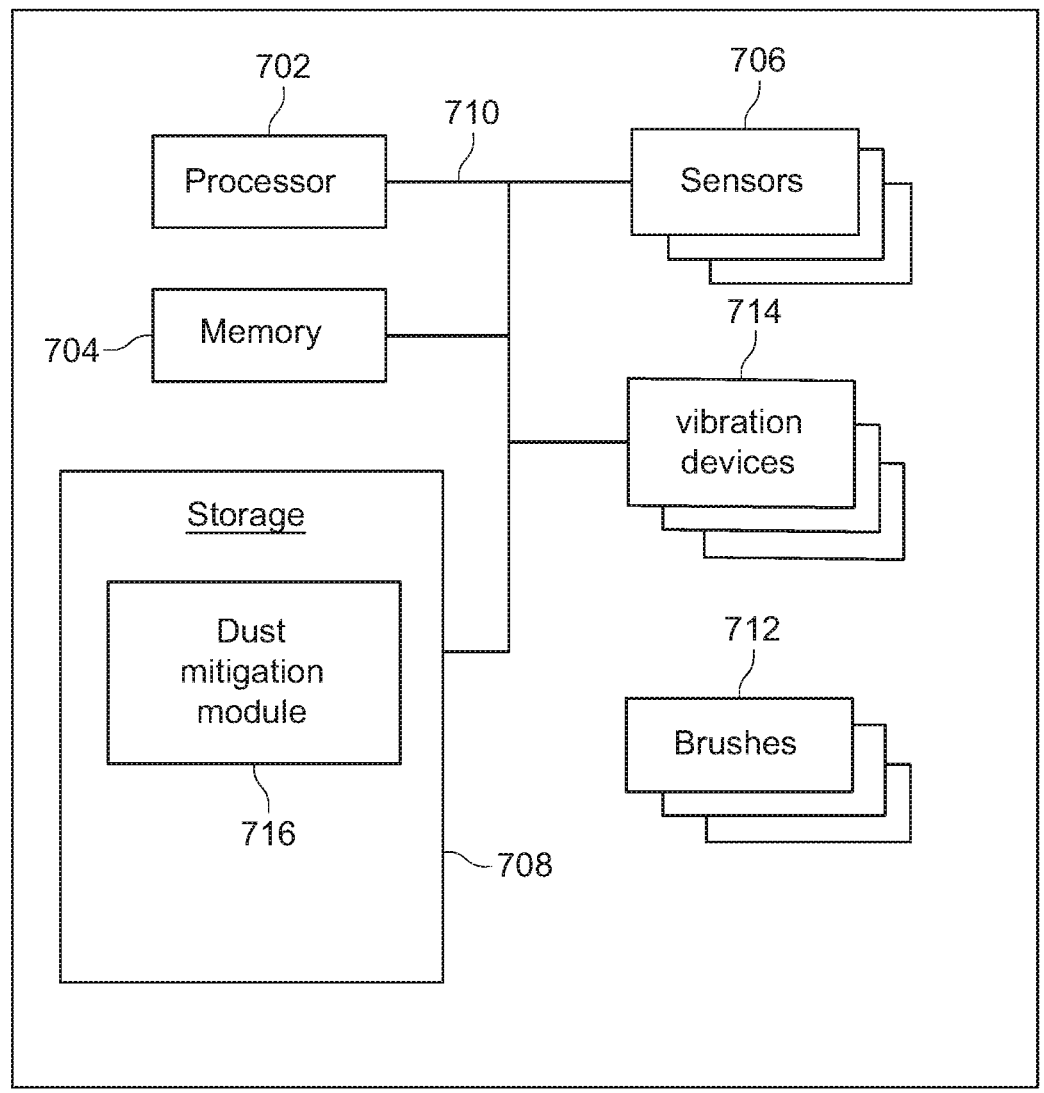
FIG. 7 is an example electronic device configured to implement dust mitigation in accordance with embodiments.

FIG. 7 is an example electronic device configured to implement dust mitigation in accordance with embodiments. The electronic device 700 may be used to implement any of the dust mitigation techniques described herein. The electronic device 700 may be, for example, a smart phone, a laptop computer, or tablet computer, among others. In some embodiments, the electronic device 700 may be a smart phone with a clamshell form factor or a smart phone with a scrolling display. The electronic device 700 may include a processor 702 configured to execute stored instructions, as well as a memory device 704 that stores instructions that are executable by the processor 702. The processor may be any suitable type of processor including a single core or multiple core central processing unit (CPU), a microcontroller, Application Specific Integrated Circuit (ASIC), a Field Programmable Gate Array (FPGA), and others.

The memory device 704 can include random access memory (e.g., SRAM, DRAM), read only memory (e.g., EPROM, EEPROM, etc.), flash memory, or any other suitable memory systems. The memory device 704 can be used to store data and software code that configure the processor to perform the various functions described herein.

The electronic device 700 can also include one or more sensors 706 configured to detect the relative movement of components of the electronic device, such as a change in a hinge angle or translational movement of a sliding component such as a scrolling screen. The movement may be reported to other components of the device 700 through a dedicated application programming interface (API) that interfaces with the sensors 706.

The electronic device 700 may also include a storage device 708. The storage device 708 may be any non-transitory computer-readable medium configured for long-term non-volatile storage of data and computer program code. The storage device 708 may be any type of physical memory device, such as a hard drive, a flash drive, and the like.

Communications between various components of the electronic device 700 can be performed over one or more data busses 710 using any suitable communication protocols, such as Mobile Industry Processor Interface (MIPI) D-PHY, PCIe, SPI, USB, among others. The bus architecture shown in FIG. 7 is just one example of a bus architecture that can be used with the techniques disclosed herein. In some examples, the data bus 710 may be a single bus that couples the components of the electronic device 700 according to a particular communication protocol. Furthermore, the electronic device 700 can also include any suitable number of data busses of varying types, which may use different communication protocols to couple specific components of the computing device according to the design considerations of a particular implementation. Various additional components may be included depending on the design considerations for a particular implementation.

The electronic device 700 also includes one or more brushes 712 for protecting against the intrusion of dust into internal recesses of the electronic device 700. The brushes may be disposed at any aperture likely to allow ingress of dust. The electronic device 700 also includes one or more vibration devices 714 configured to deliver a vibrational stimulus to the brushes 712 to implement the techniques described herein.

The storage device 708 may include any number of software applications for performing the techniques described herein, such as dust mitigation module 716. The dust mitigation module 716 may be running in the background and configured to receive data from the sensors 706. Data from the sensors 706 may be used to activate the dust shedding and dust collection modes as described herein.

It is to be understood that the block diagram of FIG. 7 is not intended to indicate that the electronic device 700 is to include all of the components shown in FIG. 7. Rather, the electronic device 700 can include fewer or additional components not illustrated in FIG. 7. Furthermore, the components may be coupled to one another according to any suitable system architecture, including the system architecture shown in FIG. 7 or any other suitable system architecture.

The techniques described herein can also be implemented in other types and combinations of circuitry. As used in this application, the term "circuitry" may refer to hardware-only circuit implementations or implementations that use a combination of hardware circuits and computer code, such as software or firmware. Hardware-only implementations may include implementations in analog or digital circuitry or a combination thereof. Implementations in a combination of hardware and computer code include processors programmed with computer code stored to one or more memory devices, which may be incorporated into the processor or accessible by the processor through a memory access interface.

It is to be understood that what is described above is what is presently considered the preferred embodiments. However, it should be noted that the description of the preferred embodiments is given by way of example only and that various modifications may be made without departing from the scope as defined by the appended claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For example, features described in the preceding description may be used in combinations other than the combinations explicitly described above. Additionally, although functions have been described with reference to certain features, those functions may be performable by other features whether described or not. Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasize an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

While endeavoring in the foregoing specification to draw attention to those features believed to be of importance, it should be understood that the Applicant may seek protection via the claims in respect of any patentable feature or combination of features hereinbefore referred to and/or shown in the drawings whether or not emphasis has been placed thereon.

What is claimed is:

1. An apparatus comprising:
   a first component coupled in a movable relationship with a second component, wherein the first component or the second component has a recess accessible through an aperture;
   a brush disposed at the aperture and comprising fibers configured to prevent intrusion of dust into the recess; and
   a vibration device configured to deliver a vibrational stimulus to the brush, wherein in response to a first movement of the first component relative to the second component the vibration device activates a dust collection mode, and in response to a second movement of the first component relative to the second component the vibration device activates a dust shedding mode,
   wherein in the dust shedding mode, the apparatus is configured to cause the fibers to exert a net force that moves dust in a direction away from the recess.

2. The apparatus of claim 1, wherein the brush comprises a first set of fibers that exhibit a first resonant response to the vibrational stimulus and a second set of fibers that exhibit a second resonant response to the vibrational stimulus.

3. The apparatus of claim 1, wherein the vibrational stimulus comprises a first vibration mode to activate the dust collection mode and a second vibration mode to activate the dust shedding mode.

4. The apparatus of claim 3, wherein the brush comprises a set of fibers that exhibit a first resonant response to the first vibration mode and a second resonant response to the second vibration mode.

5. The apparatus of claim 3, wherein the first vibration mode comprises a first frequency and the second vibration mode comprises a second frequency different from the first frequency.

6. The apparatus of claim 1, wherein in the dust collection mode, the apparatus is configured to cause the fibers to move laterally across the aperture to increase collection of dust.

7. The apparatus of claim 1, wherein the apparatus is a device with a clamshell form factor and the first component and the second component are coupled by a hinge, wherein the dust collection mode is activated in response to an increase in an angle of the hinge and the dust shedding mode is activated in response to a decrease in an angle of the hinge.

8. The apparatus of claim 1, wherein the second component is retractable within the first component, wherein the dust collection mode is activated in response to the second component being retracted into the first component, and the dust shedding mode is activated in response to the second component being extended from the first component.

9. The apparatus of claim 1, wherein the vibration device is an acoustic speaker.

10. The apparatus of claim 1, wherein the first resonant response is different from the second resonant response.

11. An apparatus comprising:
    at least one processor; and
    at least one memory storing instructions that, when executed by the at least one processor, cause the apparatus at least to:
    detect a user manipulation of the apparatus, the apparatus further comprising a vibration device, and a first component coupled in a movable relationship with a second component, wherein the first component or the second component has a recess accessible through an aperture; and
    based on the user manipulation, activate a selected vibration mode of a brush disposed at the aperture, wherein the selected vibration mode is selected from among a dust shedding mode and a dust collection mode,
    wherein the dust shedding mode is activated by a first frequency of the vibration device and the dust collection mode is activated by a second frequency of the vibration device, and wherein the first frequency is different from the second frequency.

12. The apparatus of claim 11, wherein the brush comprises a first set of fibers and a second set of fibers, wherein the selected vibration mode is configured to generate a first response in the first set of fibers and a second response in the second set of fibers, wherein the first response is different from the second response.

13. The apparatus of claim 11, wherein said detecting a user manipulation comprises at least one of detecting a change in a hinge angle or detecting a translational movement of the second component relative to the first component.

14. A method comprising:
    detecting a user manipulation of an apparatus, the apparatus comprising a vibration device, and a first component coupled in a movable relationship with a second component, wherein the first component or the second component has a recess accessible through an aperture; and based on the user manipulation, activating a selected vibration mode of a brush disposed at the aperture, wherein the selected vibration mode is selected from among a dust shedding mode and a dust collection mode, wherein during the dust collection mode, fibers of the brush move laterally across the aperture to increase collection of dust.

15. The method of claim 14, wherein during the dust shedding mode, the fibers exert a net force that moves dust in a direction away from the recess.

16. A non-transitory computer readable medium comprising program instructions stored thereon for causing an apparatus to perform at least the following:

detecting a user manipulation of the apparatus, the apparatus comprising a first component coupled in a movable relationship with a second component, wherein the first component or the second component has a recess accessible through an aperture; and based on the user manipulation, activating a selected vibration mode of a brush disposed at the aperture, wherein the selected vibration mode is selected from among a dust shedding mode and a dust collection mode, wherein during the dust shedding mode, fibers of the brush exert a net force that moves dust in a direction away from the recess.

17. The non-transitory computer readable medium of claim 16, wherein during the dust collection mode, the fibers of the brush move laterally across the aperture to increase collection of dust.

18. The apparatus of claim 11, wherein during the dust shedding mode, fibers of the brush exert a net force that moves dust in a direction away from the recess.

19. The apparatus of claim 11, wherein during the dust collection mode, fibers of the brush move laterally across the aperture to increase collection of dust.

20. The method of claim 14, wherein the dust shedding mode is activated by a first frequency of the vibration device and the dust collection mode is activated by a second frequency of the vibration device, wherein the first frequency is different from the second frequency.

* * * * *